United States Patent
Birnkrant (10) Patent No.: US 10,071,425 B2
(45) Date of Patent: Sep. 11, 2018

(54) METHOD FOR FABRICATING METAL FOAMS HAVING LIGAMENT DIAMETERS BELOW ONE MICRON

(71) Applicant: United Technologies Corporation, Hartford, CT (US)

(72) Inventor: Michael J. Birnkrant, Kenilworth, NJ (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 80 days.

(21) Appl. No.: 15/037,573

(22) PCT Filed: Aug. 13, 2014

(86) PCT No.: PCT/US2014/050866
§ 371 (c)(1),
(2) Date: May 18, 2016

(87) PCT Pub. No.: WO2015/076881
PCT Pub. Date: May 28, 2015

(65) Prior Publication Data
US 2016/0288210 A1 Oct. 6, 2016

Related U.S. Application Data

(60) Provisional application No. 61/906,105, filed on Nov. 19, 2013.

(51) Int. Cl.
| | |
|---|---|
| *B22F 3/11* | (2006.01) |
| *B22F 5/00* | (2006.01) |
| *C22C 1/08* | (2006.01) |
| *B22F 9/22* | (2006.01) |
| *B82Y 30/00* | (2011.01) |
| *B82Y 40/00* | (2011.01) |

(52) U.S. Cl.
CPC .......... *B22F 3/1143* (2013.01); *B22F 3/1125* (2013.01); *B22F 5/009* (2013.01); *B22F 9/22* (2013.01); *B82Y 30/00* (2013.01); *B82Y 40/00* (2013.01); *C22C 1/08* (2013.01); *B22F 2201/013* (2013.01); *B22F 2201/10* (2013.01); *B22F 2301/15* (2013.01); *B22F 2302/25* (2013.01); *B22F 2998/10* (2013.01); *B22F 2999/00* (2013.01); *F05D 2220/323* (2013.01); *F05D 2230/20* (2013.01); *F05D 2300/16* (2013.01); *F05D 2300/612* (2013.01)

(58) Field of Classification Search
CPC ........ B22F 3/125; B22F 3/1143; B22F 5/009; B82Y 30/00; B82Y 40/00
See application file for complete search history.

(56) References Cited

U.S. PATENT DOCUMENTS

| | | |
|---|---|---|
| 2004/0029982 A1 | 2/2004 | Erkey et al. |
| 2012/0028798 A1 | 2/2012 | Worsley et al. |
| 2013/0087069 A1 | 4/2013 | Hunt et al. |

FOREIGN PATENT DOCUMENTS

| | | |
|---|---|---|
| WO | 03057367 A2 | 7/2003 |
| WO | 2012063591 A1 | 5/2012 |

OTHER PUBLICATIONS

International Search Report and Written Opinion for International Application No. PCT/US2014/050866; dated Nov. 21, 2014.
European Search Report for European Application No. 14863128.6, dated Sep. 8, 2017, 7 pages.
Gash et al., "Monolithic nickel(II)-based aerogels using an organic epoxide: the importance of the counterion", Journal of Non-Crystalline Solids, vol. 350, 2004, pp. 145-151.
Tappan et al., "Ultralow-Denisty Nanostructured Metal Foams: Combustion Synthesis, Morphology, and Composition", Journal of American Chemical Society, vol. 128, 2006, pp. 6589-6594.

*Primary Examiner* — Edward J Cain
(74) *Attorney, Agent, or Firm* — Cantor Colburn LLP (57) ABSTRACT

A method for fabricating a metal foam component from an aerogel containing a polymer and nanoparticles is disclosed. The method may comprise: 1) exposing the aerogel to a reducing condition at an elevated temperature for a reaction time to provide a metal foam; and 2) using the metal foam to fabricate the metal foam component. At least one of the elevated temperature and the reaction time may be selected so that at least some ligaments of the metal foam have a desired ligament diameter or at least some pores of the metal foam have a desired pore size. The desired ligament diameter may be less than about one micron and the component may be a component of a gas turbine engine.

18 Claims, 7 Drawing Sheets

METHOD FOR FABRICATING METAL FOAMS HAVING LIGAMENT DIAMETERS BELOW ONE MICRON

FIELD OF DISCLOSURE

The present disclosure relates to lightweight and high-strength metal foams, and more specifically, relates to a method for producing nanocellular metal foams having ligament diameters below one micron as materials for aerospace components.

BACKGROUND

Metal foams, which are lightweight and high-strength porous metallic structures, are gaining increasing interest in numerous industries, such as the aerospace and automotive industries. In particular, the introduction of components formed from metal foam materials into aerospace or automotive structures may lead to improvements in fuel efficiency, while providing other beneficial properties such as vibration dampening, erosion resistance, and enhanced mechanical strength and overall performance. Moreover, metal foams may have high temperatures resistances and, therefore, may provide thermal protection properties for a range of applications as well.

Nanocellular metal foams are a sub-class of metal foams which have pore sizes in the nanoscale or submicron range. Open-celled nanocellular metal foams, which have open and gas-filled pores, may appear as a network of interconnected ligaments that form the solid, metallic portion of the metal foam. The diameters of the ligaments (as measured by the width of the ligament at its narrowest part) may be correlated with the strength-to-weight ratio of the metal foam. In particular, it has been predicted that the strength of a nanocellular metal foam may approach the strength of an identically-sized solid metal part as its ligament diameters decrease, while at only a fraction of the weight of the solid metal part. For at least this reason, nanocellular metal foams having high integrity ligaments with diameters on the nanoscale or submicron scale may be a desirable target for many engineers. Despite the benefits that such lightweight and high-strength materials may provide for numerous applications, it currently remains a challenge to fabricate metal foams with ligament diameters below one micron.

Current methods for producing stochastic metal foams may use powder metallurgy in which a metal powder may be mixed with a foaming agent and compacted to a dense structure. The metal and foaming agent mixture may then be heated to cause the foaming agent to release gas and expand the metal material, causing it to form a porous structure. Such methods for producing metal foams have been described, for example, in U.S. Pat. Nos. 6,444,007 and in 2,751,289. In addition, electroplating may also be used to produce metal foams. While effective, the existing metal foam fabrication methods may fail to provide metal foams having ligament diameters below one micron. Furthermore, these fabrication methods may offer limited control over the ligament diameters of the metal foams and their corresponding mechanical properties. Clearly, there is a need for fabrication methods capable of producing metal foams with ligament diameters on the submicron scale.

SUMMARY

In accordance with one aspect of the present disclosure, a method for fabricating a metal foam component from and aerogel containing a polymer and nanoparticles is disclosed. The method may comprise: 1) exposing the aerogel to a reducing condition at an elevated temperature for a reaction time to provide a metal foam, wherein at least one of the elevated temperature and the reaction time may be selected so that at least some ligaments of the metal foam have a desired ligament diameter or at least some pores of the metal foam have a desired pore size; and 2) using the metal foam to fabricate the metal foam component.

In another refinement, the desired ligament diameter may be less than about one micron.

In another refinement, the metal foam component may be a component of a gas turbine engine.

In another refinement, exposing the aerogel to the reducing condition at the elevated temperature for the reaction time may both pyrolyze the polymer and at least partially reduce the nanoparticles to the metal foam.

In another refinement, the reducing condition may be an atmosphere of hydrogen gas in an inert gas.

In another refinement, the elevated temperature may be in the range of about 400° C. to about 1000° C.

In another refinement, the method may further comprise preparing the aerogel from a mold prior to exposing the aerogel to the reducing condition.

In another refinement, preparing the aerogel from the mold may comprise: 1) polymerizing a polymer precursor in a solvent containing a metal salt to form a gel comprising the polymer and the nanoparticles; and 2) evaporating the solvent by a supercritical drying process to provide the aerogel.

In another refinement, the polymer precursor may be propylene oxide and the polymer may be polypropylene oxide.

In another refinement, the metal salt may be a hydrate of a nickel (II) salt and the nanoparticles may be nickel (II) oxide nanoparticles.

In accordance with another aspect of the present disclosure, a metal foam component having ligament diameters below one micron is disclosed. The metal foam component may be produced from an aerogel containing a polymer and nanoparticles by a method comprising: 1) exposing the aerogel to a reducing condition at an elevated temperature for a reaction time to provide a metal foam, wherein at least one of the elevated temperature and the reaction time may be selected so that at least some ligaments of the metal foam have a desired ligament diameter or at least some pores of the metal foam have a desired pore size; and 2) using the metal foam to fabricate the metal foam component.

In another refinement, the metal foam component may be a component of a gas turbine engine.

In another refinement, exposing the aerogel to the reducing condition may both pyrolyze the polymer and at least partially reduce the nanoparticles to the metal foam.

In another refinement, the reducing condition may be an atmosphere containing hydrogen gas in an inert gas.

In another refinement, the elevated temperature may be in the range of about 400° C. to about 1000° C.

In another refinement, the method may further comprise preparing the aerogel prior to exposing the aerogel to the reducing condition.

In another refinement, preparing the aerogel may comprise: 1) polymerizing a polymer precursor in a solvent containing a metal salt to form a gel comprising the polymer and the nanoparticles; and 2) evaporating the solvent by a supercritical drying process to provide the aerogel.

In another refinement, the polymer precursor may be propylene oxide and the polymer may be polypropylene oxide.

In accordance with another aspect of the present disclosure, a method for producing a metal foam from an aerogel comprising a polymer and nanoparticles is disclosed. The method may comprise: 1) heating the aerogel at an elevated temperature to pyrolyze the polymer; and 2) exposing the aerogel to a reducing condition to at least partially reduce the nanoparticles to the metal foam.

In another refinement, heating the aerogel and exposing the aerogel to a reducing condition may be carried out simultaneously for a reaction time.

In another refinement, a ligament diameter or a pore size of the metal foam may be controllable by at least one of the elevated temperature and the reaction time.

These and other aspects and features of the present disclosure will be more readily understood when read in conjunction with the accompanying drawings.

It should be understood that the drawings are not necessarily drawn to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments disclosed herein.

DETAILED DESCRIPTION

Figure 1:
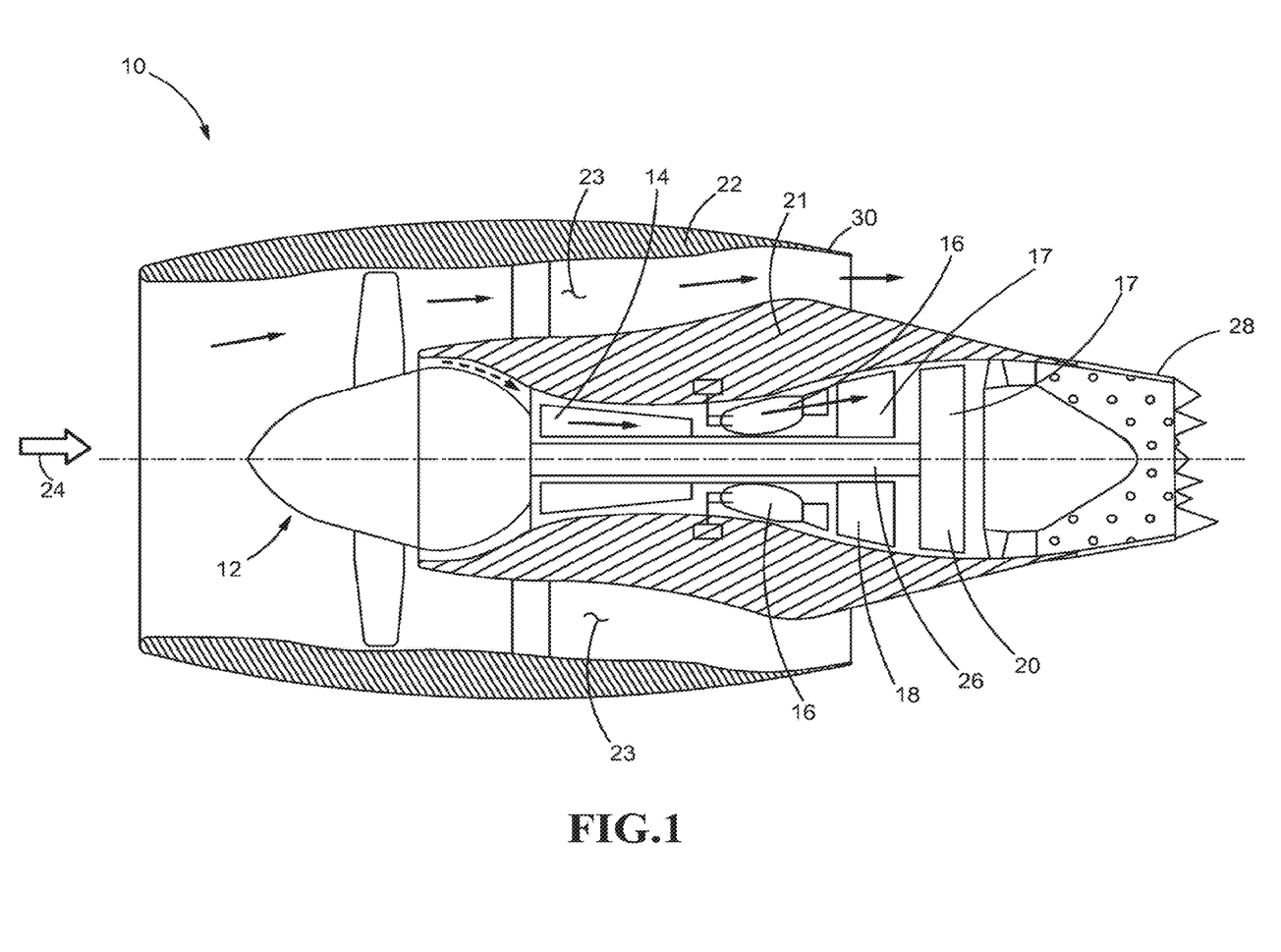
FIG. 1 is a cross-sectional view of a gas turbine engine, constructed in accordance with the present disclosure.

Referring now to the drawings, and with specific reference to FIG. 1, a gas turbine engine 10 in accordance with the present disclosure is depicted. In an upstream to downstream direction, the gas turbine engine 10 may consist of a fan section 12, a compressor section 14 (which may include both a low-pressure compressor and a high-pressure compressor), an annular combustor 16 (although circumferentially-spaced "can" combustors may also be used), and a turbine section 17 (which may include a high-pressure turbine 18 and a low-pressure turbine 20), all of which may be encased in an engine case 21, as shown. A nacelle 22 may surround the engine case 21 and define a bypass duct 23, as shown.

In normal operation, air 24 may be drawn into the engine 10 and accelerated by the fan section 12. After passing the fan section 12, a part of the air 24 may be routed through the compressor section 14, the combustor(s) 16, and the turbine section 17. More specifically, the air 24 may first be compressed and pressurized in the compressor section 14 and it may then be mixed with fuel and combusted in the combustor(s) 16 to generate hot combustion gases. The hot combustion gases may then expand through and drive the turbines 18 and 20 which may, in turn, drive the compressor section 14 and the fan section 12 by driving the rotation of an interconnecting shaft 26. After passing through the turbines 18 and 20, the gases may be exhausted through an exhaust nozzle 28 to provide some of the propulsive thrust to an associated aircraft or to provide power if used in land-based operations. The remaining propulsive thrust may be provided by the air 24 passing through the bypass duct 23 and exiting the engine 10 through a nozzle 30, as shown.

Each component in the gas turbine engine 10 and the nacelle 22 may contribute to the overall weight of an associated aircraft. Where there is a desire to reduce the weight and/or increase the mechanical strength (elastic modulus, etc.) of components or regions of the gas turbine engine 10, one or more gas turbine engine components may be at least partially formed from a metal foam 32 (see FIG. 2). The metal foam 32 may be lightweight and have a high mechanical strength. Accordingly, the fabrication of gas turbine engine components from the metal foam 32 may lead to advantageous reductions in fuel efficiency of the gas turbine engine 10 as a whole, as well as improvements in the performance features of the gas turbine engine components made from the metal foam. These performance features may include, but are not limited to, increased mechanical strength, improved vibration dampening and erosion resistance, and increased temperature resistance. In particular, the fan section 12, the compressor section 14, the combustor(s) 16, the turbine section 17, and/or the nacelle 22 may include one or more components formed, at least in part, from the metal foam 32. As one non-limiting possibility, one or more blade outer air seals may be fabricated, at least in part, from the metal foam 32. As will be understood by those with ordinary skill in the art, a blade outer air seal may be located between the rotating blades of a rotor stage (located in the compressor section 14 or the turbine section 17) and the engine case 21. Furthermore, although the incorporation of the metal foam 32 into gas turbine engine components is disclosed as a non-limiting example, it is to be understood that the concepts described herein are not limited to gas turbine engines and may be applicable to other applications as well.

Figure 2:
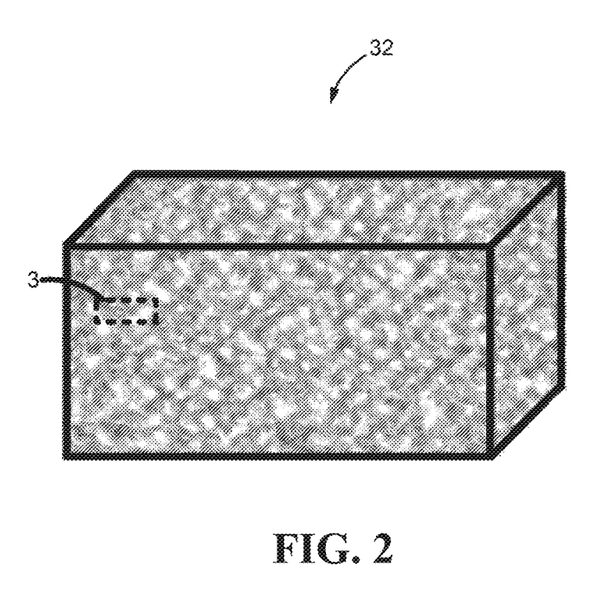
FIG. 2 is a perspective view of a metal foam, constructed in accordance with the present disclosure.

The metal foam 32 may have any structure suitable for its intended use and, therefore, may deviate from the exemplary box-like structure shown in practice. The metal foam 32 may be formed from a monolithic metal, a multi-metal, a metal alloy, a monolithic ceramic material, a ceramic-containing material, or combinations thereof. The metal or metals may be various metals such as, but not limited to, manganese, titanium, tungsten, vanadium, niobium, hafnium, tatalum, rhenium, ruthenium, iridium, palladium, platinum, zirconium, cobalt, yttrium, copper, molybdenum, aluminum, chromium, iron, nickel, or combinations thereof. In addition, other elements may be synthesized into the metal foam 32 such as silicon and carbon. Moreover, additional elements may be present in the metal foam to enhance specific properties. For example, if the metal foam 32 is formed from nickel aluminide ($Ni_3Al$), boron may be added to enhance desired properties. It is also noted that the metal foam 32 may contain fractions of metal oxide in some cases (see further details below).

Figure 3:
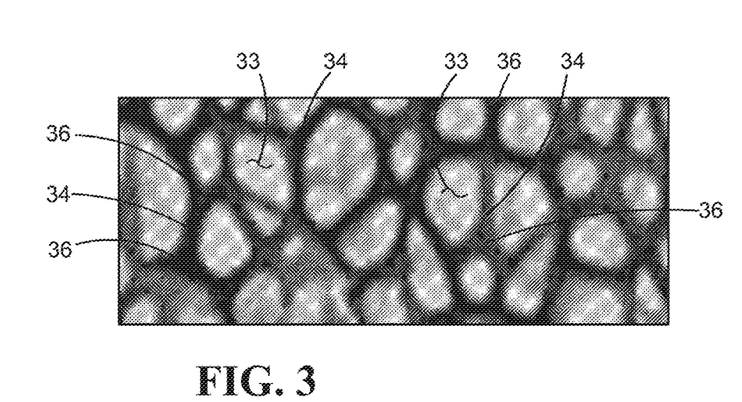
FIG. 3 is an expanded view of detail 3 of FIG. 2, constructed in accordance with the present disclosure.
Figure 4:
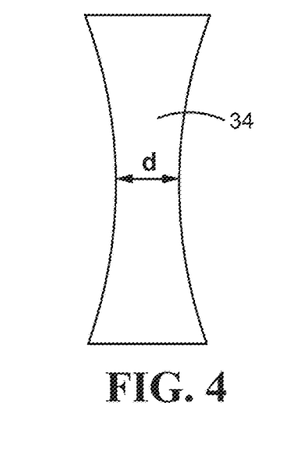
FIG. 4 is a front view of a ligament of the metal foam shown in isolation.

As best shown in FIG. 3, the metal foam 32 may have a plurality of pores 33 formed between a network of interconnected ligaments 34. Each of the ligaments 34 of the metal foam 32 may extend between two joints 36, wherein each of the joints 36 may form a branching point between two or more ligaments 34. Notably, at least some, if not all, of the ligaments 34 of the metal foam 32 may have a diameter (d) of less than about one micron. As best shown in FIG. 4, the diameter (d) of each ligament 34 may be measured by the width of the ligament at its narrowest point. The pores 33 of the metal foam 32 may be open and gas-filled, and they may have non-uniform or random sizes and geometries. Accordingly, the metal foam 32 may be a stochastic, open-celled foam. However, in some circumstances, the pores 33 may be filled (closed-cell foam) and/or the geometries of the pores 33 may be uniform throughout the metal foam 32. In any event, the sizes of the pores 33 may range from less than about 50 nanometers up to about 1.5 micron (1500 nanometers). Given the nanoscale size of its pores, the metal foam 32 may be a nanocellular foam.

Due to its submicron ligament dimensions, the metal foam 34 may have a substantially increased strength-to-weight ratio compared with similarly-sized metal foams of the prior art, which typically have ligament diameters greater than one micron. In addition, the mechanical properties (strength-to-weight ratio, elastic modulus, etc.) of the metal foam 32 may be correlated with the diameter (d) of the ligaments 34. In general, the mechanical strength and the strength-to-weight ratio of the metal foam 32 may increase as the diameter (d) of the ligaments 34 decrease. Furthermore, a desired submicron diameter (d) of the ligaments 34 and/or the pore sizes of the metal foam 32 may be selected in order to impart the metal foam 32 with specific mechanical properties such as, but not limited to, a desired elastic modulus or a desired strength-to-weight ratio. Once the desired ligament diameter (or pore size) is selected, the metal foam 32 may be prepared by selecting reaction conditions that provide the desired ligament diameters and/or pore sizes (see further details below).

Figure 5:
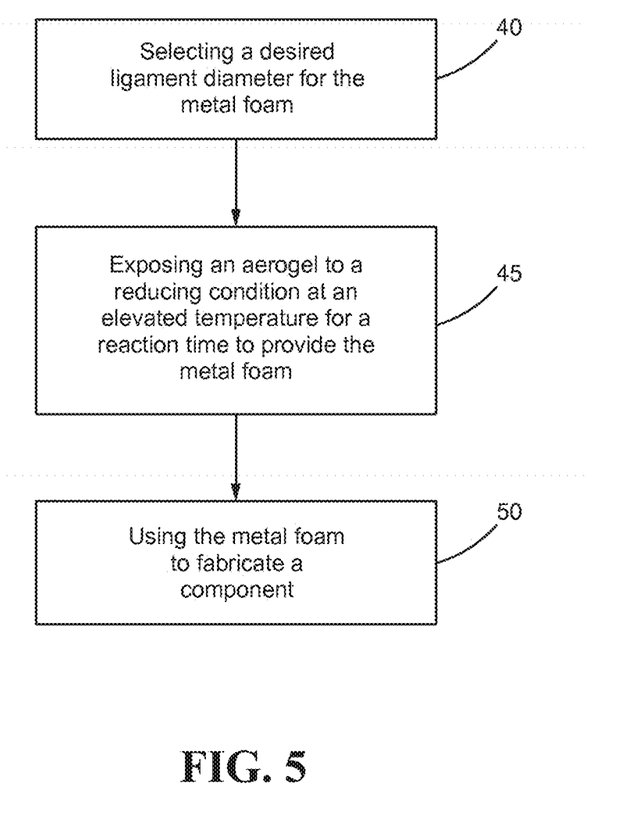
FIG. 5 is a flowchart depicting a series of steps involved in producing the metal foam and a component from the metal foam, in accordance with a method of the present disclosure.
Figure 6:
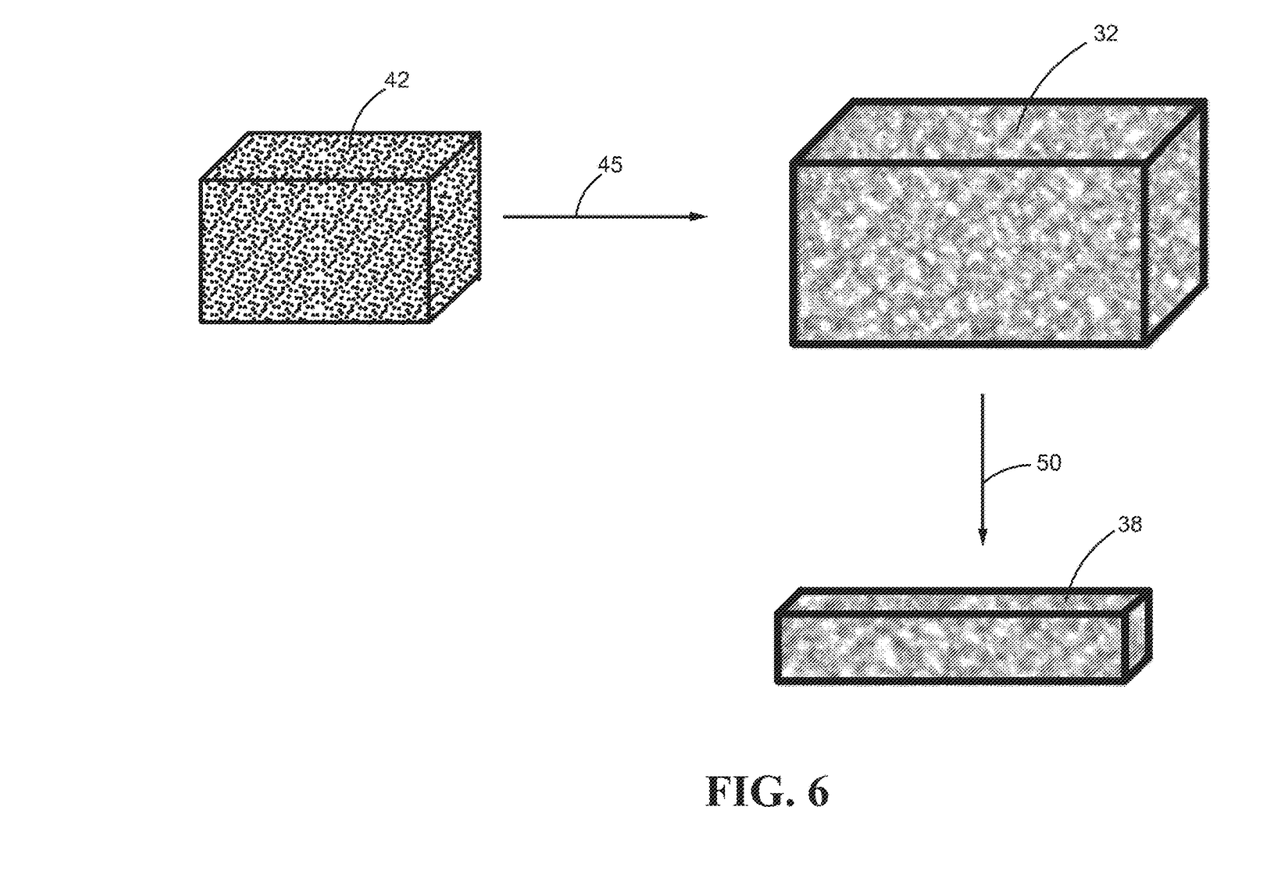
FIG. 6 is a schematic illustration some of the steps of FIG. 5.

Turning now to FIGS. 5 and 6, a method for producing the metal foam 32 and a component 38 at least partially made from the metal foam 32 is depicted. As explained above, the component 38 may be a component of the gas turbine engine 10, or it may be a component for use in another suitable application. Beginning with a first block 40, a desired ligament diameter (d) and/or pore size for the metal foam 32 may be selected in order to impart the metal foam 32 with specific mechanical properties such as, but not limited to, a desired strength-to-weight ratio and/or a desired elastic modulus. In general, the desired ligament diameter may be a diameter less than about one micron.

Once the desired ligament diameter and/or pore size is selected, the metal foam 32 may be prepared from an aerogel 42 according to a next block 45 (also see FIG. 6). As will be apparent to those with ordinary skill in the art, the aerogel 42 may be a lightweight and low-density porous structure that is formed by replacing solvent molecules with gas molecules. The pores of the aerogel 42 may be filled with gas molecules, while the solid portions of the aerogel 42 may consist of a polymer and nanoparticles. Notably, the nanoparticles in the aerogel 42 may be the molecular precursors to the metal foam product. In this regard, the identity of the nanoparticles in the aerogel 42 may be dependent on the desired material composition of the metal foam 32. For example, if a nickel foam is the desired product, the nanoparticles in the aerogel 42 may be nickel (II) oxide nanoparticles. However, if the desired product is a ceramic foam or a ceramic-containing foam, the nanoparticles may be ceramic oxide nanoparticles or ceramic-containing metal oxide nanoparticles.

The aerogel 42 may be prepared by a sol-gel process (see further details below) or it may be obtained from a commercial supplier. In any event, the block 45 may involve exposing the aerogel 42 to a reducing condition at an elevated temperature for a reaction time to produce the metal foam 32 having at least some ligaments 34 with the desired diameter and/or at least some pores with the desired pore size. During the block 45, the polymer may be pyrolyzed and removed (burned-off) from the aerogel 42, while the nanoparticles may be simultaneously converted to the metal foam 32. The reducing condition may be a reducing atmosphere, such as an atmosphere of hydrogen gas in an inert gas, although other reducing conditions and/or reducing agents may also be used. As a non-limiting possibility, the reducing condition may be an atmosphere of 4% (v/v) hydrogen gas in argon. In addition, suitable elevated temperatures for carrying out the block 45 may be in the range of about 400° C. to about 1000° C., although other temperatures may be used.

Importantly, at least one or both of the elevated temperature and the reaction time used for the block 45 may be used to control the ligament diameters (or pore sizes) of the resulting metal foam 32. In particular, Table 1 shows the influence of the elevated temperature on the pore sizes of a nickel metal foam (at a constant reaction time of 480 minutes) and Table 2 shows the influence of the reaction time on the pore sizes of a nickel metal foam (at a constant elevated temperature of 1173K).

TABLE 1

Influence of the Elevated Temperature on Pore Sizes of Nickel Foams.[a,b]

| Sintering Temperature (K) | Pore Size (nm) |
|---|---|
| 273 | 1900 |
| 773 | 900 |
| 873 | 700 |
| 973 | 500 |

[a]Process time held constant at 480 minutes.
[b]Pore sizes measured using porosimetry and neutron scattering.

TABLE 2

Influence of Reaction Time on Pore Sizes of Nickel Foams.[a,b]

| Sintering Time (minutes) | Grain Size (nm) | Pore Size (nm) |
|---|---|---|
| 0 | 3 | 1900 |
| 1 | 12 | 1800 |
| 90 | 100 | 800 |
| 480 | 200 | 500 |

[a]Temperature held constant at 1173 K.
[b]Pore sizes measured by x-ray diffraction and neutron scattering.

As can be seen in Tables 1 and 2, there is a correlation between the elevated temperature and/or the reaction time and the pore size of the resulting metal foam 32. In general, shorter reaction times and/or lower elevated temperatures provide metal foams with larger pores, while longer reaction times and/or higher elevated temperatures provide metal foams with smaller pores. However, it is noted that the correlation between the reaction time and/or the elevated temperature may be dependent on the type of metal or ceramic forming nanoparticles of the aerogel 42. In addition, the ligament diameters of the resulting metal foam may or may not exhibit the same temperature and reaction time dependence as those shown in Tables 1 and 2. Based on known correlations between the elevated temperature and/or the reaction time and the pore sizes (or ligament diameters) of the resulting metal foam 32 such as those shown in Tables 1 and 2 above, at least one of the elevated temperature and the reaction time used for carrying out the block 45 may be selected so that at least some of the pores 33 have a desired pore size and/or at least some of the ligaments 34 of the metal foam product have a desired diameter.

It is also noted that, in some circumstances, less than complete reduction of the nanoparticles in the aerogel 42 and/or less than complete pyrolysis of the polymer in the aerogel 42 may occur during the block 45, leaving behind a fraction of polymer and/or nanoparticles in the metal foam 32. However, the pyrolysis/reduction of the aerogel 42 may driven to at least near completion by varying the reaction conditions, such as the elevated temperature, the reaction time, and/or the concentration of hydrogen gas. Furthermore, while the block 45 may be carried out as a single manipulation as described above, in some circumstances it may be possible to instead perform the pyrolysis of the polymer and the reduction of the metal oxide nanoparticles by separate manipulative steps. For example, the aerogel 42 may first be heated to an elevated temperature sufficient to pyrolyze the polymer, and it may be subsequently exposed to a reducing condition to reduce the nanoparticles to the metal foam 32.

Following the block 45, the metal foam 32 may be used to fabricate the component 38 according to a next block 50, as shown. The metal foam 32 may be formed in the shape of the desired component 38 during the block 45 with an appropriate mold or other tooling, or it may be shaped following the block 45 using appropriate tooling or other shaping techniques. Alternatively, the aerogel 42 may already be formed in the shape of the desired component 38 prior to the block 45. The metal foam 32 may form the entire body of the component 38, or it may be applied as a coating or surface layer of a desired thickness to selected surfaces of the component 38. In other circumstances, the metal foam 32 may form the core of the component 38, and the metal foam core may be surrounded by a solid shell which protects the metal foam 32 from mechanical damage, such as abrasion, and/or environmental damage. In the latter case, the solid shell may be formed from one or more metals or metal alloys. In any event, the mechanical properties of the component 38 may be tailored as desired by tuning the diameters (d) of the ligaments 34 (or pore sizes) of the metal foam 32. As explained above, tuning of the diameters (d) (or pore sizes) of the metal foam 32 may be achieved by varying the elevated temperature and/or the reaction time that is used during the block 45.

Figure 7:
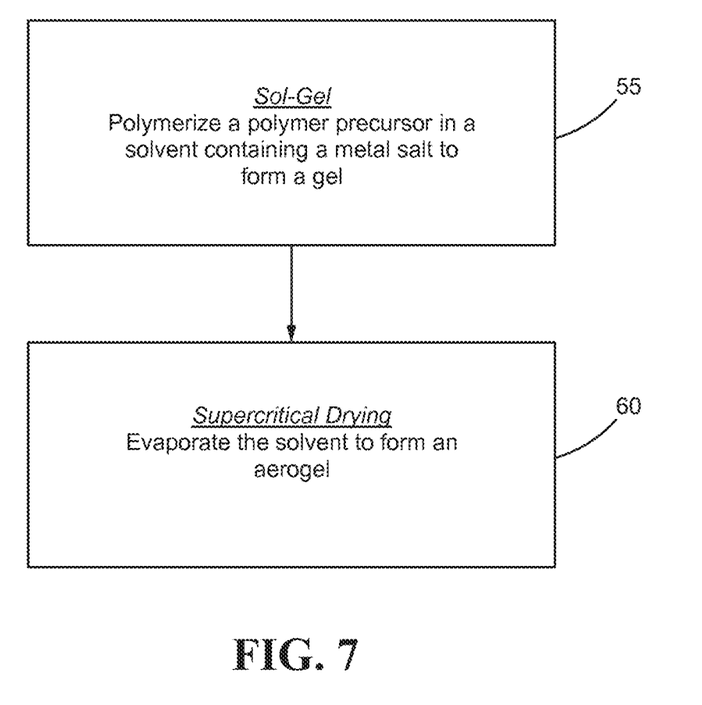
FIG. 7 is a flowchart depicting steps involved in producing an aerogel that is used for producing the metal foam, in accordance with a method of the present disclosure.
Figure 8:
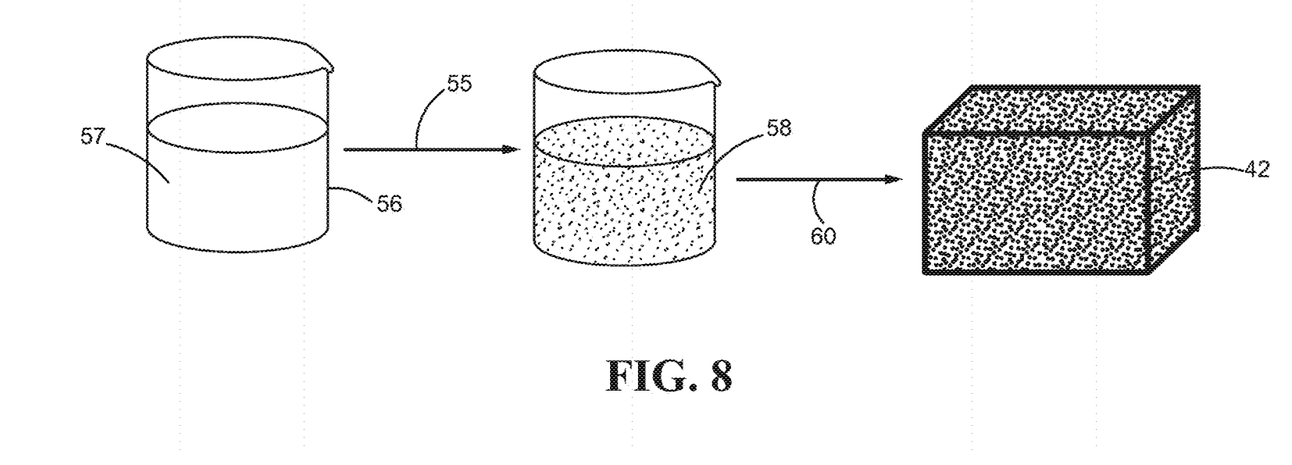
FIG. 8 is a schematic illustration of the steps of FIG. 7.

Referring now to FIGS. 7 and 8, a method for producing the aerogel 42 is shown. According to a first block 55, one or more polymer precursors may be polymerized in a liquid solvent containing one or more metal salts. In particular, the block 55 may involve preparing a solution containing the liquid solvent and the metal salt(s) in a reaction vessel 56, adding the polymer precursor to the solution to form a mixture 57, and allowing the mixture 57 to form a biphasic gel 58 (see FIG. 8). Although shown as a beaker, the reaction vessel 56 may be any type of reaction vessel, or even a mold to control the shape of the resulting aerogel 42. In general, the block 55 may be carried out at room temperature and under atmospheric pressure, although other conditions may also be used. During the block 55, the polymer precursor may be converted to a polymer and the metal cations of the metal salt may be converted to a plurality of metal oxide nanoparticles by a sol-gel process, as will be understood by those skilled in the art. Depending on the identity of the polymer precursor(s), the polymer generated by the block 55 may be a homopolymer (i.e., consisting of one type of monomer subunit) or a copolymer (i.e., consisting of two or more types of monomer subunits), in which case it may be a block copolymer (i.e., consisting of 'blocks' of one type of monomer subunit alternating in series with 'blocks' of another type of monomer subunit) or another type of copolymer. The biphasic gel 58 produced by the block 55 may consist of at least two distinct phases, including a liquid solvent phase and an insoluble solid phase, with the polymer forming the insoluble solid phase. The metal oxide nanoparticles may be soluble in both the liquid solvent phase and the insoluble polymer phase of the gel 58.

Suitable solvents for use in the sol-gel process (block 55) may include, but are not limited to, ethanol, ethanol-water mixtures, other alcohols or polar protic solvents, or other suitable solvents. The polymer precursor may be an epoxide such as propylene oxide or another suitable polymer precursor. Accordingly, if propylene oxide is used as the polymer precursor, the polymer produced by the block 55 may be polypropylene oxide. In addition, suitable metal salts for the sol-gel step (block 55) may depend on the composition of the desired metal foam 32. For example, if a nickel foam is the desired product, the metal salt may be a nickel (II) salt or a hydrate of a nickel (II) salt such as, but not limited to, nickel (II) chloride, nickel (II) nitrate, a hydrate of nickel (II) chloride, a hydrate of nickel (II) nitrate, or combinations thereof. If a nickel salt is used, then the metal oxide nanoparticles produced during the block 55 may be nickel oxide nanoparticles. However, as will be understood by those skilled in the art, other types of metal salts may also be employed depending on the desired composition of the metal foam product. In addition, if a ceramic foam is the desired product, the metal salts may instead be a ceramic precursor such as, but not limited to, molybdenum chloride and tetraethyl orthosilicate.

Following the block 55, the solvent (or the liquid phase portion) of the gel 58 may be evaporated to convert the gel 58 to the aerogel 42 according to a next block 60. The block 60 may be performed by a supercritical drying process or another suitable solvent evaporation process. If supercritical drying is used to evaporate the solvent of the gel 58, the gel 58 may be subjected to temperatures and pressures above the critical point (including a critical temperature (Tc) and a critical pressure (Pc)) of the solvent where a distinction between the liquid phase and the gas phase of the solvent does not exist, followed by depressurization of the system and cooling to atmospheric conditions. As will be appreciated, the conditions used for the supercritical drying process (block 60) may be dependent on the critical point of the solvent used. As one possibility, the block 60 may be carried out by first exchanging the liquid solvent in the gel 58 with liquid carbon dioxide ($CO_2$), followed by supercritical drying of the liquid $CO_2$ at its critical point (for $CO_2$: Tc=31° C. and Pc=7.4 MPa). The resulting aerogel 42 may then be subjected to pyrolysis/reduction according to the block 45 as described in detail above (see FIGS. 5-6).

Figure 9:
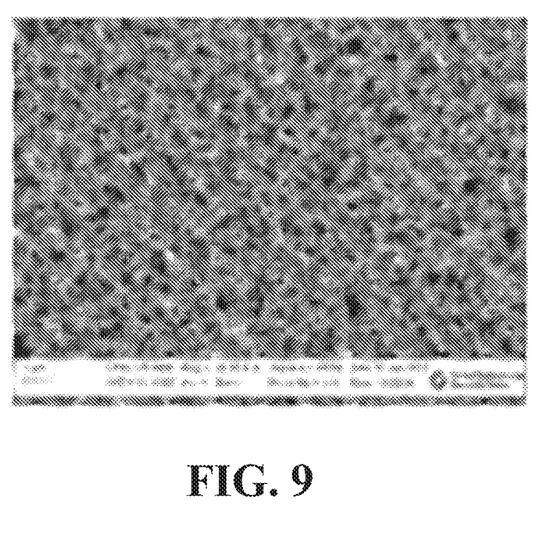
FIG. 9 is a scanning electron microscopy (SEM) image of a nickel foam produced by the method of FIGS. 5 and 6.

It has been found that treatment of a solution of propylene oxide and nickel (II) chloride hexahydrate in ethanol according to the method described above and shown in FIGS. 7-8 provides an aerogel 42 consisting of polypropylene oxide and nickel oxide nanoparticles having an average diameter of about 5 nanometers. Treatment of the resulting aerogel 42 to a reducing atmosphere of hydrogen gas in argon at an elevated temperature as described above (see FIGS. 5-6) produces a nickel foam having ligament diameters below one micron as measured by scanning electron microscopy (SEM) (see FIG. 9). Furthermore, the method was found to successfully provide other types of metal foams with ligament diameters below one micron when using other metal salts (or ceramic precursors) as starting materials.

The following non-limiting example protocol for producing a nickel foam further illustrates the method of the present disclosure.

EXAMPLE 1

Formation of a Nickel Foam Having Ligament Diameters Below One Micron

I. Gel Preparation: 0.37 g (1.56 mmol) of nickel (II) chloride hexahydrate ($NiCl_2 \cdot 6H_2O$) was dissolved in 2.5 mL of 200-proof ethanol to provide a clear, light-green solution. Propylene oxide (1.0 g; 17 mmol) was added to the solution and the resulting mixture was incubated at room temperature under ambient conditions for 30 minutes to allow an opaque, light-green gel to form. The gel was aged for at least 24 hours under ambient conditions and the 200-proof ethanol was exchanged at least four times over the course of several days to a week.

II. Nickel Oxide Aerogel Preparation: The gel produced by step (I) was placed in a supercritical dryer and the ethanol was exchanged with liquid $CO_2$ over the course of 2-3 days. The liquid $CO_2$ was then dried under supercritical conditions by heating the gel to about 45° C. while maintaining a pressure of about 100 bar (10 MPa) to produce a light-green nickel (II) oxide aerogel. The resulting aerogel was then depressurized at a rate of about 7 bar/hr.

III. Nickel Foam Preparation: The light-green aerogel produced by step (II) was placed in a tube furnace under flowing 4% (v/v) hydrogen gas in argon and the tube furnace was heated to about 600° C. for 8 hours. The tube furnace was then cooled to about 60° C. under argon and perfluoroalkyl carboxylic acid was flowed into the tube furnace to control the degree of oxidation of the resulting nickel foam. The tube furnace was then purged with argon for three hours and the resulting nickel foam was removed.

INDUSTRIAL APPLICABILITY

In general, it can therefore be seen that the technology disclosed herein may have industrial applicability in a variety of settings including, but not limited to, industrial applications which may benefit from lightweight and high-strength materials. In particular, the method of the present disclosure provides a route for producing nanocellular metal foams having high-integrity ligaments with diameters on the submicron scale by exposing an aerogel containing a polymer and metal oxide nanoparticles to an elevated temperature under reducing conditions. As metal foams prepared by current fabrication methods have ligament diameters above one micron, the method disclosed herein may provide metal foams with significantly higher strength-to-weight ratios than existing metal foams. Notably, desired mechanical properties (e.g., mechanical strength, strength-to-weight ratio, elastic modulus, etc.) for the metal foam (and the component that is fabricated from the metal foam) may be engineered by tuning the ligament diameter of the metal foam. As disclosed herein, the diameters of the ligaments of the metal foam may be controlled by varying the reaction conditions (e.g., temperature, reaction time) that are used during reduction/pyrolysis of the aerogel. Furthermore, the method of the present disclosure may be amenable to bulk processing and scale up to quantities appropriate for industrial materials and components, such as gas turbine engine components. It is expected that the technology disclosed herein may find wide industrial applicability in numerous areas such as, but not limited to, aerospace and automotive applications.

What is claimed:

1. A method for fabricating a metal foam component from an aerogel containing a polymer and nanoparticles, comprising:
    exposing the aerogel to a reducing condition at an elevated temperature for a reaction time to provide a metal foam, at least one of the elevated temperature and the reaction time being selected so that at least some ligaments of the metal foam have a desired ligament diameter or at least some pores of the metal foam have a desired pore size; and
    using the metal foam to fabricate the metal foam component, wherein the metal foam component is a component of a gas turbine engine.

2. The method according to claim 1, wherein the desired ligament diameter is less than about one micron.

3. The method according to claim 2, wherein exposing the aerogel to the reducing condition at the elevated temperature for the reaction time both pyrolyzes the polymer and at least partially reduces the nanoparticles to the metal foam.

4. The method according to claim 3, wherein the reducing condition is an atmosphere of hydrogen gas in an inert gas.

5. The method according to claim 4, wherein the elevated temperature is in a range of about 400° C. to 1000° C.

6. The method according to claim 4, further comprising preparing the aerogel from a mold prior to exposing the aerogel to a reducing condition.

7. The method according to claim 6, wherein preparing the aerogel from the mold comprises:
    polymerizing a polymer precursor in a solvent containing a metal salt to form a gel comprising the polymer and the nanoparticles; and
    evaporating the solvent by a supercritical drying process to provide the aerogel.

8. The method according to claim 7, wherein the polymer precursor is propylene oxide and the polymer is polypropylene oxide.

9. The method according to claim 8, wherein the metal salt is a hydrate of a nickel (II) salt and the nanoparticles are nickel (II) oxide nanoparticles.

10. A metal foam component having ligament diameters below one micron, the metal foam component being produced from an aerogel containing a polymer and nanoparticles by a method comprising:
    exposing the aerogel to a reducing condition at an elevated temperature for a reaction time to provide a metal foam, at least one of the elevated temperature and the reaction time being selected so that at least some ligaments of the metal foam have a desired ligament diameter or at least some pores of the metal foam have a desired pore size; and
    using the metal foam to fabricate the metal foam component, wherein the metal foam component is a component of a gas turbine engine.

11. The metal foam according to claim 10, wherein exposing the aerogel to the reducing condition at the elevated temperature for the reaction time both pyrolyzes the polymer and at least partially reduces the nanoparticles to the metal foam.

12. The metal foam according to claim 11, wherein the reducing condition is an atmosphere of hydrogen gas in an inert gas.

13. The metal foam according to claim 12, wherein the elevated temperature is in a range of about 400° C. to about 1000° C.

14. The metal foam according to claim 12, wherein the method further comprises preparing the aerogel prior to exposing the aerogel to the reducing condition.

15. The metal foam according to claim 14, wherein preparing the aerogel comprises:
   polymerizing a polymer precursor in a solvent containing a metal salt to form a gel comprising the polymer and the nanoparticles; and
   evaporating the solvent by a supercritical drying process to provide the aerogel.

16. A method for producing a metal foam from an aerogel comprising a polymer and nanoparticles, comprising:
   heating the aerogel at an elevated temperature to pyrolyze the polymer; and
   exposing the aerogel to a reducing condition at the elevated temperature to at least partially reduce the nanoparticles to the metal foam.

17. The method according to claim 16, wherein heating the aerogel and exposing the aerogel to a reducing condition are carried out simultaneously for a reaction time.

18. The method according to claim 17, wherein a ligament diameter or a pore size of the metal foam is controllable by at least one of the elevated temperature and the reaction time.

* * * * *